United States Patent
Diemer et al.

(10) Patent No.: US 7,351,345 B2
(45) Date of Patent: Apr. 1, 2008

(54) METHOD FOR MANUFACTURING A MODULE FOR TREATING A FLUID

(75) Inventors: Wolfgang Diemer, Waldstetten (DE);
Klaus Figgle, Weil der Stadt (DE);
Klaus Feifel, Schwäbisch Gmünd (DE)

(73) Assignee: Pall Corporation, East Hills, NY (US)

( * ) Notice: Subject to any disclaimer, the term of this patent is extended or adjusted under 35 U.S.C. 154(b) by 0 days.

(21) Appl. No.: 11/239,462

(22) Filed: Sep. 30, 2005

(65) Prior Publication Data

US 2006/0027508 A1   Feb. 9, 2006

Related U.S. Application Data

(60) Division of application No. 10/603,628, filed on Jun. 26, 2003, now abandoned, which is a continuation of application No. PCT/EP01/15195, filed on Dec. 21, 2001.

(30) Foreign Application Priority Data

Dec. 29, 2000   (DE)   ............................... 100 65 258

(51) Int. Cl.
*B01D 37/02*   (2006.01)

(52) U.S. Cl. ...................... 210/777; 427/181; 427/244; 141/5; 141/12

(58) Field of Classification Search ................ 210/193, 210/317, 486, 502.1, 503, 505, 777, 778, 210/291, 679, 680; 55/476, 524, DIG. 5; 96/134, 154; 427/181, 244; 141/5, 9–12
See application file for complete search history.

(56) References Cited

U.S. PATENT DOCUMENTS

| | | | |
|---|---|---|---|
| 2,235,624 A | * | 3/1941 | Schwartz ..................... 55/476 |
| 3,259,248 A | | 7/1966 | Wiegand |
| 3,499,532 A | * | 3/1970 | Schneider .................... 210/138 |
| 3,816,304 A | * | 6/1974 | Wallis et al. ................ 210/777 |
| 4,454,044 A | | 6/1984 | Klein |
| 4,647,415 A | | 3/1987 | Schafft |

(Continued)

FOREIGN PATENT DOCUMENTS

DE   740 455   10/1943

(Continued)

*Primary Examiner*—Matthew O. Savage
(74) *Attorney, Agent, or Firm*—Leydig, Voit & Mayer, Ltd.

(57) ABSTRACT

A module enabling individual adaptation by the user to the respective task in the treatment of fluids using housings and connections of existing filtration devices without any modification is described. The module comprises one or more cells stacked one on top of the other, each of these having at least one opening, the opening of the cell or the similar openings of the cells together forming at least one channel for feeding or discharging the fluid to be treated. Each cell has two flat, porous components delimiting an inner space and designed for passage of the fluid therethrough, the inner space or spaces being connected to the channel. The inner space of the cell or cells contains at least partially a treatment material for the fluid. The method for manufacturing such a module makes provision for a treatment material to be introduced with a carrier fluid into the cells through the channel provided for feeding the fluid.

16 Claims, 1 Drawing Sheet

U.S. PATENT DOCUMENTS

| | | | |
|---|---|---|---|
| 4,704,207 A | | 11/1987 | Chu |
| 4,842,739 A | * | 6/1989 | Tang .................... 210/489 |
| 4,871,456 A | | 10/1989 | Naruo et al. |
| 5,069,791 A | | 12/1991 | Becker et al. |
| 5,169,528 A | | 12/1992 | Karbachsch et al. |
| 5,290,457 A | | 3/1994 | Karbachsch et al. |
| 5,427,683 A | | 6/1995 | Gershon et al. |
| 5,478,466 A | * | 12/1995 | Heilmann et al. .......... 210/205 |
| 5,908,558 A | | 6/1999 | Holland |
| 6,022,477 A | | 2/2000 | Luo et al. |
| 6,113,792 A | * | 9/2000 | Benjamin et al. ........... 210/636 |
| 6,498,329 B1 | | 12/2002 | Gibernau |
| 6,875,352 B1 | | 4/2005 | Diemer et al. |

FOREIGN PATENT DOCUMENTS

| | | |
|---|---|---|
| DE | 32 04 022 | 8/1983 |
| DE | 37 41 552 | 6/1989 |
| DE | 38 02 816 | 8/1989 |
| DE | 39 34 249 | 4/1991 |
| DE | 39 43 249 | 7/1991 |
| DE | 198 57 751 | 6/2000 |
| WO | WO 00/35555 | 6/2000 |

* cited by examiner ved together and held so as to be sealed from one
METHOD FOR MANUFACTURING A MODULE FOR TREATING A FLUID This application is a division of U.S. patent application Ser. No. 10/603,628 filed on Jun. 26, 2003, now abandoned, which is a continuation of International Application No. PCT/EP01/15195, filed Dec. 21, 2001, which is incorporated herein by reference in its entirety and for all purposes.

BACKGROUND OF THE INVENTION

The invention relates to a module for treating fluids with one or more cells stacked one on top of the other, each of these having at least one opening, the opening of the cell or the similar openings of the cells together forming at least one channel for feeding the fluid to be treated, each cell having two flat, porous components delimiting an inner space, and the inner space or spaces being connected to the channel. The invention also relates to a method for manufacturing such modules.

In filtration technology it is known to use filter candles with fillings which either form a precoat or are introduced in the dry state.

Such a filter device is known from DE 39 43 249 A1. This comprises a perforated core pipe, a perforated support casing, a completely closed top closure cap carrying a guide element, and a bottom closure cap having a central opening with a connection piece connected thereto. The cavity formed between the core pipe, the support casing and the two closure caps is filled with bulk material consisting of reclaimable filtration-active substances. The fluid to be filtered flows in radial direction from the outside to the inside, and the filtrate is discharged through the core pipe.

The disadvantage of this device is that it must be filled by the candle manufacturer because the filled cavity is closed when the top closure cap is fitted. This means that the user must specify the type of filling material when ordering the filter candle. A further disadvantage is that the filling may settle when transported or stored for a longer time, thereby creating a free space through which the unfiltered fluid flows through the candle.

DE 38 02 816 A1 describes a candle-shaped filter element, the outer circumferential wall of which is in the form of a porous support layer for a filter cake. This filter cake is formed by precoating filter material, for example, kieselguhr or fiber mixtures and adsorbents such as activated carbon, silicic acid material and the like. When the filter cake is worn out, it is washed away by back flushing and replaced by a new precoated filter cake, and the precoated filter material of the removed filter cake has to be recovered in a complicated way outside the filter housing. It is, at any rate, necessary to precoat a new filter cake prior to continuing with the filtering operation. This filtering device has the disadvantage that only precoatable materials can be used.

DE 32 04 022 C2 describes a filter cartridge which is supposed to have greater stability and improved efficiency. The cartridge has a coaxial structure and is filled with filtration-active material through which the fluid flows essentially in axial direction owing to the walls being formed by permeable and impermeable sections.

In filtration technology it is also known to use filter modules having a number of filter cells which are stacked one on top of the other and each have a central opening.

These filter modules differ in their design and operation.

A variant of these known filter modules has a central support pipe on which the prefabricated filter cells are arranged in a row between two adapters attached at the ends.

When assembling the filter module, the filter cells are pressed together and held so as to be sealed from one another. Such a filter module is described, for example, in DE 37 41 552 A1, where prefabricated filter cells are used.

Another variant of known filter modules dispenses with a support pipe. On their inner circumference the filter cells are provided at the central opening with retaining and connecting rings which are welded together when stacking the filter cells on one another so as to join the filter module and make it into a solid unit. Other embodiments provide spacer and/or drainage elements which are arranged as disc-shaped elements between the filter layers and/or filter cells and make it possible for these to be mechanically joined to one another.

In spite of different designs of the filter modules, the filter cells have in common that the filter sheets are made of flat materials such as, for example, filter cardboards, papers, tiles or fabrics.

So-called filter layers are widely used as filter sheets. A depth-filter material comprising organic and/or inorganic fibrous and/or granular substances is to be understood by this term.

As a rule, cellulose and/or plastic fibers which may have filtration-active substances such as, for example, kieselguhr or pearlites embedded therein are used as base material for these filter layers. Kieselguhr and pearlites serve to enlarge the inner surface and therefore increase the capacity to absorb the turbid matter.

The filter layers are used in fields ranging from clarification and treatment of liquids throughout the entire beverage industry to the pharmaceutical and chemical industries. Filter layers do not only have a screening effect whereby coarse particles are retained on the surface of the filter layer, but also, in particular, a depth effect for fine particles which are retained in the void spaces within the depth-filter material. Depending on the type of materials used, these filter layers may, for example, also have an adsorbing effect or interact with the unfiltered fluid in another way which goes beyond the purely mechanical filtration effect. Moreover, the surface may be subsequently treated for certain applications so as to prevent detachment of fibrous particles in the dry and damp states.

To date, the purpose of the filtration has always determined the composition of the filter layers. This means that production of the filter layers has always had to be preceded by definition of their subsequent range of application.

Since any conversion of the method of producing the filter layers entails problems and minimum quantities always have to be produced, small batches of specially adapted filter layers are relatively expensive.

The filter modules may be operated in two ways.

A filter module in which filter cells and support bodies are alternately stacked on one another along a central pipe is known from EP 0 233 999 A2. The filter cells also contain supporting structures for supporting the filter material of the filter cells. The unfiltered fluid is fed to the filter cells from the exterior, and the filtrate is discharged through the interior of the filter cells and through the central pipe. Herein it is disadvantageous that, on the one hand, the support bodies prevent uniform feed of the unfiltered fluid to the filter cells, and, on the other hand, the filter substances accumulate on the support bodies between the filter cells throughout the entire interior of the module filter.

To remedy these deficiencies it was proposed in DE 198 57 751.6-27 that the unfiltered fluid be fed through the central channel of the filter cells. These filter cells to which the fluid is fed from the interior require corresponding support bodies between the filter cells to prevent inflation of the filter layers during filtration. Filter modules designed and operated in this way are also referred to as inverse modules.

The object of the invention is to create a module which the user can individually adapt to the respective task in the treatment of fluids using housings and connections of existing filtration devices without any modification.

The object is accomplished by the interior of the cell or cells at least partially containing treatment material.

SUMMARY OF THE INVENTION

Within the scope of the invention, cells are to be understood as all types of filter cells, but these cells are not only used for filtration because the treatment material introduced into the cells is not limited to filtration-active materials but may also include other substances such as, for example, extractors.

The application of the module is thereby extended beyond filtration.

The advantage of the module according to the invention is that the range of application of the module does not have to be specified for its manufacture because this is only determined when the treatment material is selected. This opens up the possibility of making the cells from neutral porous components which do not contain any special additives. It is therefore adequate, for example, to produce filter layers from the known base materials, i.e., essentially from cellulose and/or plastic fibers. The cost of manufacturing the filter modules is thereby considerably reduced because only a few types of porous components such as, for example, filter layers have to be produced in large batches, and the purpose for which they are to be used is only specified later by the choice of treatment material. However, the invention is not limited to these so-called neutral components.

It is thereby made possible for the user himself to fill the module on site, which is particularly advantageous when the materials are toxic and expensive.

In addition, he can introduce his own material about which he may have know-how of his own. Sensitive materials whose efficacy may suffer from transportation from the module manufacturer to the user or from intermediate storage can be introduced on site shortly before operation of the module. The service life of a filling is then no longer a problem.

Since the further development of the modules according to the invention relates to the filling of the cells in association with the porous components, there is no need to alter the dimensions of the module, and existing filter housings and connections may therefore be used.

DETAILED DESCRIPTION OF THE INVENTION

Figure 1:
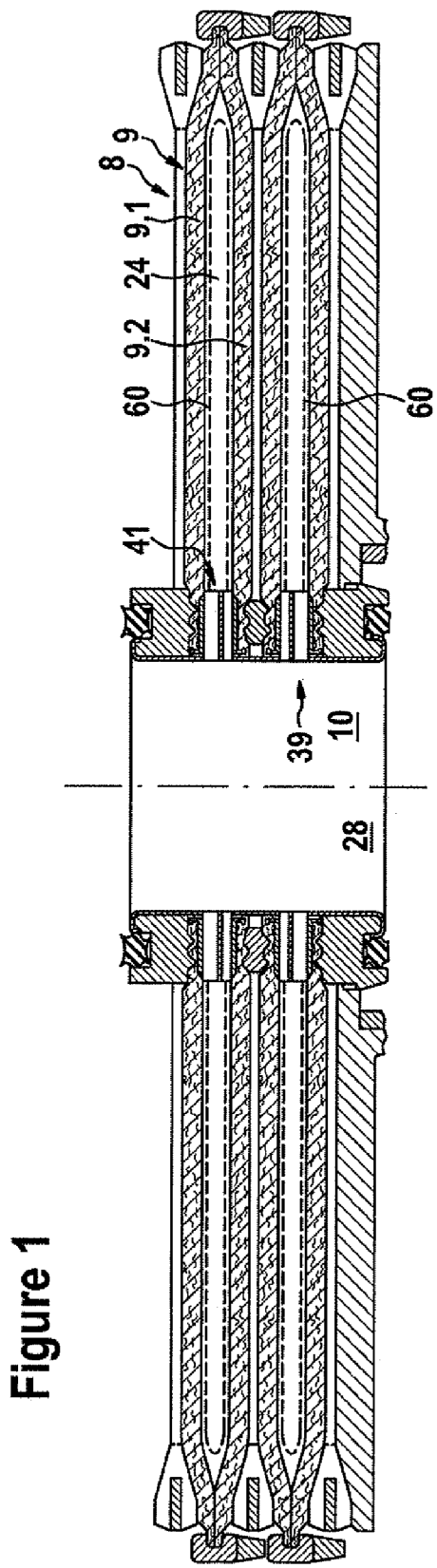
FIG. 1 is a cross-sectional view of a module comprising cells containing a treatment material according to an embodiment of the invention.

FIG. 1 shows modules 8 comprising cells 9, each cell having a central opening 10 and comprising layers 9.1 and 9.2 of a filter material, and a hollow inner space 24 between the layers, wherein the inner space at least partially contains the treatment material 60. Fluid reaches the interior of the cells via central channel 28 and openings 39. Support element 41 keeps the hollow space 24 in open communication with the channel 28.

The treatment material may be powdery, granular, fibrous and/or gel-like.

Apart from filter layers, membranes such as plastic or metal membranes, woven or non-woven fabrics may also be used as flat, porous components.

Filtration-active materials are preferably used as treatment materials. These include all known substances such as, for example, pearlites, kieselguhrs, fibrous materials, but also adsorbents such as activated carbon, PVPP, PVPP-iodine substances.

It has been found that the efficacy of, for example, activated carbon or PVPP is significantly greater than with filter layers in which these materials have been embedded in the filter layer during the manufacture because the active surfaces are impaired by the incorporation in the filter layer. With the module according to the invention less filtration-active material is thus required for the same performance and effect. This is particularly advantageous when expensive materials are used.

Sensitive materials may now also be used as adsorbents. It is thus possible to introduce into the filter module adsorbents which in the production of filter layers would become inactive as a result of the production process, for the production of the filter layers is based on an aqueous mash which has to be dried in a furnace. In this production process water-sensitive or heat-sensitive adsorbents would lose their effectiveness during the production. It is thus possible to open up completely new fields of use for such a module.

Extractors such as, for example, materials of plant origin, which release active substances and thereby impart certain ingredients or properties to the fluid to be treated may also be used as treatment materials. It is also possible to combine filtration with metered addition of active substances. Preset porous components may also be used, and the metered addition may be carried out via the treatment material.

The interior preferably contains dry treatment material, which has the advantage that, in particular, materials which are sensitive to moisture may be used.

The treatment material is preferably applied to the inner side of the porous components. The filling level for the respective application can be determined by way of the amount of material, taking into account the existing cell volumes.

In accordance with a further embodiment the interior of the cells may be provided with a material in which the treatment material is embedded or to which the treatment material adheres. A non-woven fabric or a porous film with adherent surfaces is preferably used. It is thus possible to uniformly distribute, in particular, adsorbents in the cell, whereby the efficacy of the materials is increased even further. Should transportation of the filled filter modules prove necessary, there is no risk of the treatment material thereby becoming unevenly distributed in the interior of the cells.

The powdery or granular treatment materials preferably have a grain size of from 0.01 mm to 10 mm. Surprisingly, it has been found that filter layers have an optimum structure for such powdery or granular materials, which does not lead to blockage. A significantly longer service life is thereby achieved.

The method for manufacturing such a module provides for the cells to be prefabricated and then assembled into a module or for the cells to be formed with assembly of the module, and for a treatment material to be introduced with a carrier fluid into the cells through the channel provided for feeding the fluid.

This takes advantage of the fact that the interior of the cells is accessible from the outside through the channel without any conversion measures having to be taken for the filling.

Gases or fluids may be used as carrier fluid, and this complies with the type of treatment material. If the treatment materials are sensitive to moisture, a gas will be chosen, and vice versa.

Air is preferably used as carrier gas, but other carrier gases such as, for example, inert gases may also be used if the treatment materials are particularly sensitive and interact with oxygen.

The treatment material is preferably introduced into the cell or cells by a pressure gradient, for example, with a pressurized gas pulse. It has been found that use of a pressurized gas pulse results in a uniform distribution of the treatment materials in all the cells.

Other preferred methods of introducing the treatment material are of a mechanical nature such as, for example, shaking, vibrations or stuffing, and these methods may also be performed with fluid support.

The invention claimed is:

1. A method for manufacturing a module for treating fluid comprising:
    obtaining a module comprising one or more cells stacked one on top of the other, each cell having at least one opening, the opening of the cell, or the openings of the cells together, forming at least one channel for feeding or discharging the fluid to be treated, the channel being suitable for introducing a treatment material for the fluid into the cell(s), wherein the treatment material comprises a filtration-active material selected from the group consisting of pearlite, kieselguhr, activated carbon, PVPP, and PVPP-iodine substances;
    each cell having two sheet-like, porous components delimiting an inner space and designed for passage of the fluid therethrough, the inner space being connected to the channel;
    introducing the treatment material with a carrier fluid into the module and each cell through the channel such that the inner space of each cell at least partially contains the treatment material for the fluid.

2. The method of claim 1, wherein the treatment material is introduced into each cell by a pressure gradient.

3. The method of claim 2, wherein the introduction of the treatment material is performed with fluid support.

4. The method of claim 2, wherein the pressure gradient comprises a pressurized gas pulse.

5. The method of claim 1, wherein the treatment material is introduced into each cell mechanically.

6. The method of claim 5, wherein the treatment material is introduced by shaking, vibrations or packing.

7. The method of claim 1, wherein the carrier fluid is a gas.

8. The method of claim 1, wherein the module includes at least two cells stacked on top of each other, the method including introducing the treatment material with the carrier fluid into each cell through the channel such that the inner space of each cell at least partially contains the treatment material for the fluid.

9. The method of claim 8, wherein the carrier fluid is a gas.

10. The method of claim 8 wherein the treatment material is uniformly distributed in the cell(s).

11. The method of claim 10, wherein introducing the treatment material with the carrier fluid includes introducing activated carbon with the carrier fluid.

12. The method of claim 10, wherein introducing the treatment material with the carrier fluid includes introducing PVPP with the carrier fluid.

13. The method of claim 8, wherein introducing the treatment material with the carrier fluid includes introducing activated carbon with the carrier fluid.

14. The method of claim 8, wherein introducing the treatment material with the carrier fluid includes introducing PVPP with the carrier fluid.

15. The method of claim 1, wherein the module contains dry treatment material.

16. The method of claim 1 wherein the treatment material is uniformly distributed in the cell(s).

* * * * *